(12) United States Patent
Grosser et al.

(10) Patent No.: US 6,964,717 B2
(45) Date of Patent: Nov. 15, 2005

(54) PROCESS FOR JOINING PLASTICS PARTS

(75) Inventors: Ulrich Grosser, Kürten (DE); Frank Krause, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 187 days.

(21) Appl. No.: 10/342,031

(22) Filed: Jan. 14, 2003

(65) Prior Publication Data

US 2003/0132554 A1   Jul. 17, 2003

(30) Foreign Application Priority Data

Jan. 17, 2002 (DE) .............................. 102 01 543

(51) Int. Cl.$^7$ ............................................ B29C 65/16
(52) U.S. Cl. .................. 156/69; 156/272.8; 156/308.4; 156/309.6; 264/482; 53/478
(58) Field of Search ............................. 156/69, 272.8, 156/272.2, 292, 308.4, 309.6; 219/121.6, 219/121.63, 121.64, 121.65, 121.66, 121.85; 264/482; 53/477, 478

(56) References Cited

U.S. PATENT DOCUMENTS

| | | | |
|---|---|---|---|
| 6,329,629 B1 * | 12/2001 | Grewell | 219/121.61 |
| 6,352,977 B1 | 3/2002 | Astles et al. | 514/18 |
| 6,407,066 B1 | 6/2002 | Wattanasin et al. | 514/19 |
| 6,432,923 B1 | 8/2002 | Wattanasin et al. | 514/19 |
| 6,592,239 B1 * | 7/2003 | Akiyama et al. | 362/267 |

* cited by examiner

*Primary Examiner*—John T. Haran
(74) *Attorney, Agent, or Firm*—Jill Denesvich

(57) ABSTRACT

The present invention provides a process for joining plastics components by a combination of pressing and laser welding, wherein, at the joining points (1) of the components (3, 4), at least a first component (3) has a resilient and/or compressible sealing lip (5), wherein the sealing lip (5) is resiliently deformed by pressing the components (3, 4) together, while the external pressure is maintained, the laser beam is directed onto the joining point (1) and, by purposeful irradiation of the joining point (1), the components (3, 4) are joined together.

5 Claims, 2 Drawing Sheets

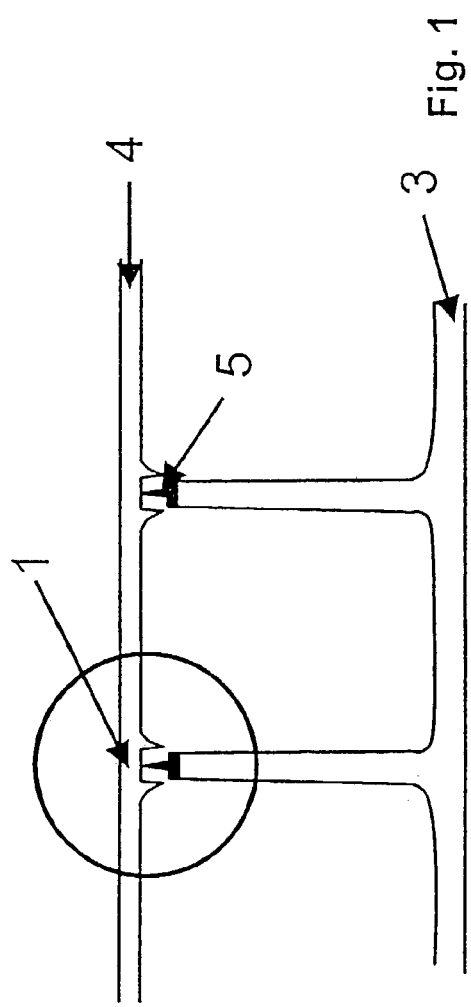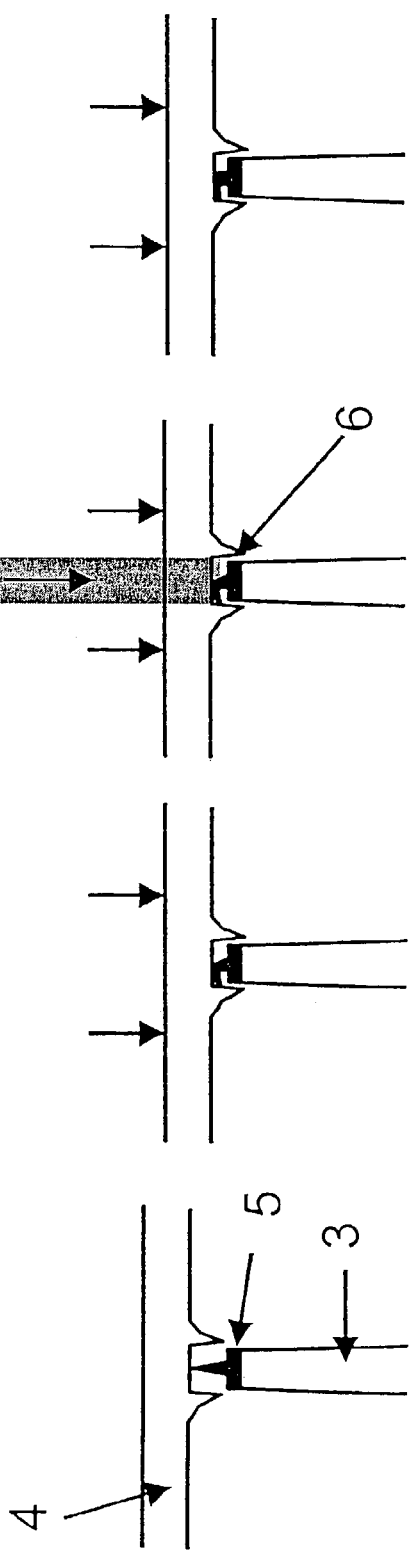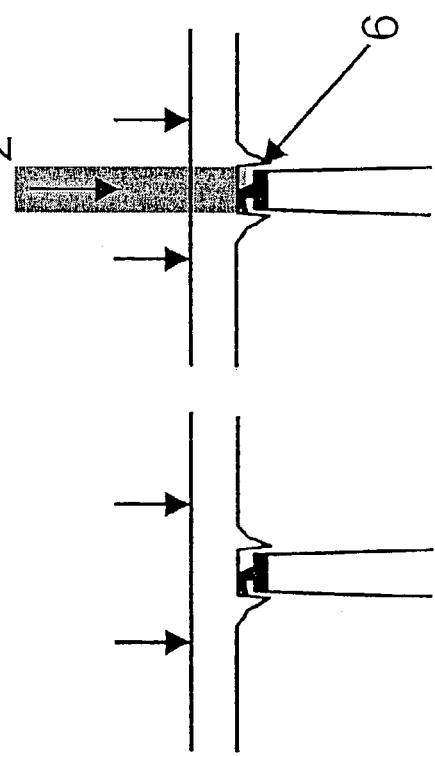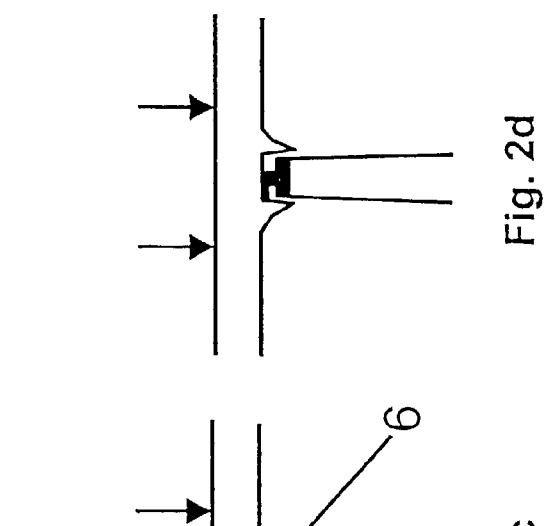

PROCESS FOR JOINING PLASTICS PARTS

FIELD OF THE INVENTION

The present invention relates, in general, to processes for joining plastics, and more specifically, to a process for joining plastics parts by a combination of pressing and laser welding using a resilient sealing lip in the area of the joining point.

SUMMARY OF THE INVENTION

The present invention provides a bonding process that avoids the disadvantages of known processes and is suitable for use in mass production. In the process of the present invention, two or more individual components are joined by a mechanical bonding process and are sealed by means of a laser beam.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the Figures, wherein:

FIG. 1 depicts two plastics components before pressing and welding;

FIG. 2a shows a magnified detail from FIG. 1;

FIG. 2b illustrates the pressing operation;

FIG. 2c depicts laser irradiation;

FIG. 2d shows components joined together;

DETAILED DESCRIPTION OF THE INVENTION

Figure 4:
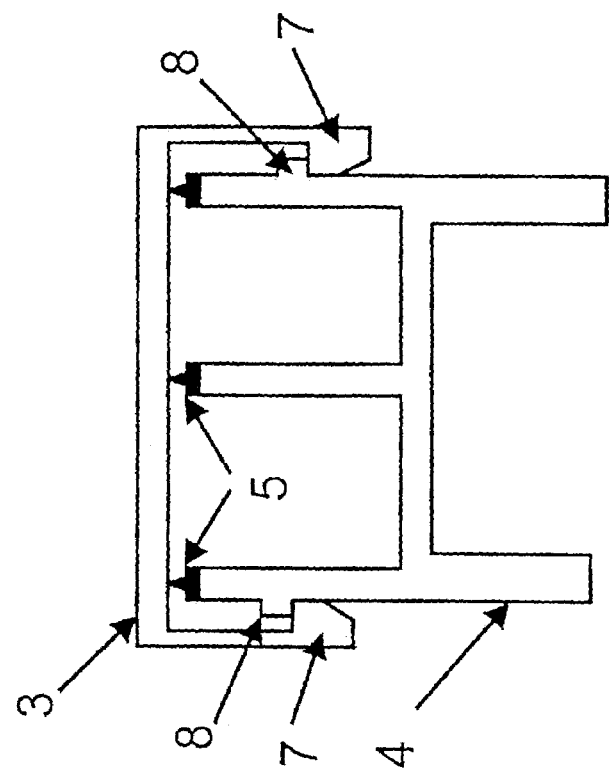
FIG. 4 depicts a longitudinal section through the intake manifold of FIG. 3.

The present invention provides a process for joining two or more plastics components by a combination of pressing and laser welding, wherein, at the joining points of the components, at least a first component has a resilient and/or compressible sealing lip, the sealing lip is resiliently deformed by pressing the components together, that, while the external pressure is maintained, a laser beam is directed onto the joining point and, by purposeful irradiation of the joining point, the components are joined together.

When producing complex components using the multishell process (such as for example intake systems), a large loop angle α of the individual parts relative to one another may frequently be necessary. As a result, there may be very considerable variation in the relative motion between the individual parts along the contact surfaces. A higher compressive pressure exists in the lower part of the workpieces than in the peripheral zones (c.f. FIG. 1). This may be a particular difficulty for all usual bonding processes, such as welding and adhesive bonding, especially in conjunction with the given production tolerances of the components.

In the process of the present invention, however, the individual parts are pressed together with a defined force and then fused together at the seal points from the outside by means of a laser beam. Due to the prevailing pressure and the fusion of the interfaces, a joint is formed as in welding. The strength of the joint may preferably be enhanced by clip- or screw-fastening the components, because, under certain circumstances, it may not be possible to expose this joint to the same loads as a conventional weld seam produced in accordance with conventional methods. To better compensate for the tolerances of the components to be joined and sealed, a compression lip of the same material or of a material injection moldable thereon may be applied onto one of the parts (preferably on a portion thereof which fits inside of another part). When the individual parts are pressed together, this compression lip is deformed and, despite the component tolerances, provides a complete joint between the parts. Moreover, the requisite "bonding pressure" is achieved along the entire seam to be sealed. In the process of the present invention, the outer material should preferably be made from laser-transparent material, such that the laser beam can penetrate the outer wall of the component without excessive loss of power.

Plastics which may be utilized for the components are any usual plastics, in particular thermoplastic or thermosetting plastics. Preferred plastics are polyamide (PA), polycarbonate (PC), acrylonitrile-butadiene-styrene (ABS), polyalkylenes, such as polyethylene (PE) or polypropylene (PP), polyesters, such as polyethylene terephthalate (PET) or poly(butylene terephthalate) (PBT), and possible combinations thereof.

A particularly preferred process is one in which the sealing lip exhibits elevated absorbency for the laser light.

The laser light source may preferably be a laser beam source with a wavelength range from 800 to 1100 nm, such as high power diode lasers or Nd:YAG lasers.

The preferred material selected for the sealing lip may be a plastic which has good adhesion properties towards both the first and the second component. Polyamide (PA), polyester, in particular poly(butylene terephthalate) (PBT), thermoplastic polyurethane (TPU) or polypropylene (PP) are preferred.

A particularly strong joint may be achieved if the component joining point takes the form of a tongue and groove combination.

The joined parts obtained by the process of the present invention may find use as automotive parts, in particular as multipart intake manifolds, radiator components, as pressurized multipart plastics components for sanitary and plumbing installations, and for household appliances.

The invention is illustrated in greater detail below by the following examples, which do not however restrict the invention.

EXAMPLES

Example 1

FIG. 1 depicts a cross-sectional view of the joint between two components 3 and 4 made from PA6 (glass fiber-reinforced polyamide 6).

At the joining point 1, component 3 has sealing lips 5 made from resilient TPU, which are oriented in the direction of the webs 6 (FIG. 2c).

According to FIG. 2a, which depicts a detailed view of FIG. 1, components 3 and 4 are positioned and then pressed together (FIG. 2b).

The laser beam 2 (Nd:YAG laser; continuously operated with a power of 35 W) was shone through component 4 (FIG. 2c) and directed onto the sealing lip 5, which was fused and became welded to the material of component 4 (FIG. 2d).

The resultant joining point 1 was pressure-tight to at least 5 bar.

Example 2

Figure 3:
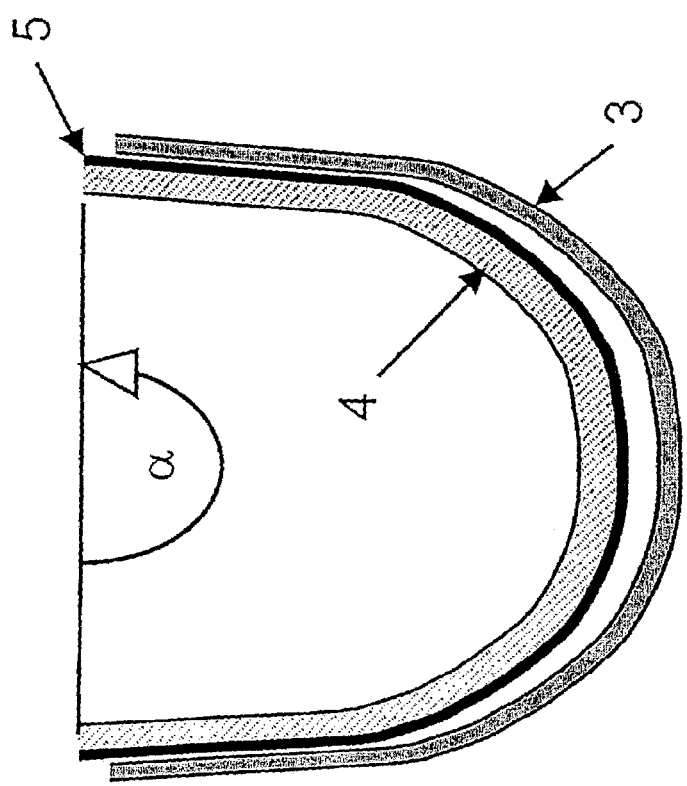
FIG. 3 illustrates two components of an air intake manifold before being joined in cross-section.

FIG. 3 shows a magnified partial view of a cross-section through two intake manifold components 3 and 4.

The upper component 4, made from glass fiber-reinforced PA 6, was provided with a thin sealing lip 5 of unreinforced PA 6.

FIG. 4 illustrates a longitudinal section through components 3 and 4.

Components 3 and 4 were pressed together and the sealing lips 5 were firmly joined to the contact surface of component 3 by laser welding (Nd:YAG laser, continuous operation, 35 W) through component 3.

Components 3 and 4 were substantially fitted together by means of a snap fastening provided by a snap-fit hook 7 and an undercut 8 in component 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for joining two or more plastic components by a combination of pressing and laser welding, the improvement comprising that at a joining point of the components, at least one component has a resilient and/or compressible sealing lip; the sealing lip is resiliently deformed by pressing the components together; while the external pressure is maintained, the laser beam is directed through one of the components to the sealing lip at the joining point; and by purposeful irradiation of the joining point, the components are joined together, wherein the sealing lip exhibits greater absorbency for the laser beam than does the component through which the radiation is passed.

2. The process according to one of claim 1, wherein a laser beam source comprises a laser of the wavelength range 800 to 1100 nm.

3. The process according to any one of claim 1, wherein the material used for the sealing lip comprises at least one plastic selected from the group consisting of polyamide (PA), polycarbonate (PC), acrylonitrile-butadiene-styrene (ABS), polyalkylenes and polyesters.

4. The process according to any one of claim 1, wherein the material used for the sealing lip comprises at least one plastic selected from the group consisting of polyethylene (PE), polypropylene (PP), polyethylene terephthalate (PET) and poly(butylene terephthalate) (PBT).

5. The process according to any one of claim 1, wherein the joining point is in the form of a tongue and groove combination.

* * * * *